(12) United States Patent
Elías et al.

(10) Patent No.: US 10,322,557 B2
(45) Date of Patent: Jun. 18, 2019

(54) FEEDING CARRIAGE FOR COMPRESSOR MACHINE AND USE OF SAME

(71) Applicants: UNIVERSIDAD DE LA RIOJA, Logrono (ES); UNIVERSIDAD POLITÉCNICA DE MADRID, Madrid (ES)

(72) Inventors: Fernando Alba Elías, Logrono (ES); Laura Martínez Martínez, Logrono (ES); Ana González Marcos, Logrono (ES); Joaquín Ordieres Meré, Madrid (ES)

(73) Assignees: Universidad de la Rioja, Logrono (ES); Universidad Politécnica de Madrid, Madrid (ES)

( * ) Notice: Subject to any disclaimer, the term of this patent is extended or adjusted under 35 U.S.C. 154(b) by 754 days.

(21) Appl. No.: 14/892,313

(22) PCT Filed: May 21, 2014

(86) PCT No.: PCT/ES2014/000086
§ 371 (c)(1),
(2) Date: Nov. 19, 2015

(87) PCT Pub. No.: WO2014/195536
PCT Pub. Date: Dec. 11, 2014

(65) Prior Publication Data
US 2016/0114549 A1 Apr. 28, 2016

(30) Foreign Application Priority Data

Jun. 4, 2013 (ES) .................................. 201300551

(51) Int. Cl.
*B29C 31/04* (2006.01)
*B30B 15/30* (2006.01)
(Continued)

(52) U.S. Cl.
CPC ............ *B30B 15/304* (2013.01); *B29C 31/04* (2013.01); *B65G 11/106* (2013.01); *B29C 31/06* (2013.01);
(Continued)

(58) Field of Classification Search
CPC .................................................... B30B 15/304
See application file for complete search history.

(56) References Cited

U.S. PATENT DOCUMENTS 2,674,008 A * 4/1954 Van Der Pyl ......... B30B 15/304
425/166
2,839,787 A * 6/1958 Stevens ................. B30B 15/304
141/250
(Continued)

FOREIGN PATENT DOCUMENTS

CN  202088501 U  12/2011
CN  202319013 U  7/2012
(Continued)

OTHER PUBLICATIONS

Lecture Notes in Management and Industrial Engineering: Selected Papers from the 17th International AEIPRO Congress held in Logrorio, Spain, in 2013—"Segregation of a Binary Granular Mixture in a Feed Shoe of a Single Punch Press".
(Continued)

*Primary Examiner* — Benjamin A Schiffman
(74) *Attorney, Agent, or Firm* — Wiggin and Dana LLP; Gregory S. Rosenblatt (57) ABSTRACT

The invention relates to a feeding carriage for a compressor machine of the type having an upper filling end through which a particulate material which is to be compressed in a mold of the compressor machine is introduced, and a lower discharging end for discharging said particulate material towards said mold. At least some of the elements forming
(Continued)

said feeding carriage can move with respect to one another, which thereby allows modifying the geometry of at least one of said lower discharging end, said upper filling end and an intermediate portion of the supply carriage located between both ends. The invention also relates to the use of such a feeding carriage comprising the initial steps of determining optimum carriage geometry for a particulate material which is to be compressed and applying said optimum carriage geometry to the feeding carriage.

7 Claims, 10 Drawing Sheets

(51) Int. Cl.
| | | |
|---|---|---|
| *B65G 11/10* | (2006.01) | |
| *B29C 43/04* | (2006.01) | |
| *B29C 43/08* | (2006.01) | |
| *B29C 43/34* | (2006.01) | |
| *B29C 31/06* | (2006.01) | |

(52) U.S. Cl.
CPC .............. *B29C 43/04* (2013.01); *B29C 43/08* (2013.01); *B29C 2043/3427* (2013.01)

(56) References Cited

U.S. PATENT DOCUMENTS

| | | | | |
|---|---|---|---|---|
| 2,970,554 A | * | 2/1961 | Haupt | B30B 11/08 425/219 |
| 4,108,338 A | * | 8/1978 | Howland | B30B 11/08 222/286 |
| 4,813,818 A | * | 3/1989 | Sanzone | B22F 3/004 406/122 |
| 5,672,313 A | * | 9/1997 | Shiga | B22F 3/004 264/460 |
| 6,343,715 B1 | * | 2/2002 | Wolfrom | B28B 13/023 141/284 |
| 2002/0001534 A1 | * | 1/2002 | Kuniyoshi | B22F 3/004 419/20 |
| 2002/0195164 A1 | | 12/2002 | Zahrah et al. | |
| 2004/0067275 A1 | | 4/2004 | Trebbi et al. | |
| 2008/0259721 A1 | | 10/2008 | Nieves-Vazquez | |
| 2012/0145085 A1 | | 6/2012 | Massicotte | |

FOREIGN PATENT DOCUMENTS

| | | |
|---|---|---|
| EP | 0262400 A1 | 4/1988 |
| ES | 2326511 A1 | 10/2009 |
| WO | 8902866 A1 | 4/1989 |

OTHER PUBLICATIONS

Search report and opinion from the Spanish Patent Office regarding the priority application, ES 201300551, dated Sep. 20, 2013 (in Spanish with an English translation).
Search report from WIPO regarding the parent application, PCT/ES2014/000086, dated Aug. 28, 2014 (in both Spanish and English).
International Preliminary Report on Patentability in Spanish, ES2014/000086, dated Dec. 8, 2015.
International Preliminary Report on Patentability, ES2014/000086, dated Dec. 8, 2015, Translated to English.
Tratado de Cooperacion en Materia de Patentes, Written Opinion, ES2014/000086, dated Aug. 19, 2014.
Patent Cooperation Treaty, Written Opinion, ES2014/000086, dated Aug. 28, 2014, Translated to English.

* cited by examiner

FEEDING CARRIAGE FOR COMPRESSOR MACHINE AND USE OF SAME

FIELD OF THE INVENTION

The present invention generally relates to the field of compressor machines and more specifically to a feeding carriage for compressor machines.

PRIOR ART

Compressor machines are widely used in different technical fields, such as, for example, in pharmacy, in the preparation of vitamins, compacted mechanical parts, microelectronics, etc. Compressor machines are used together with a feeding carriage, providing a mold of the compressor machine with the starting particulate material in which said particulate material is compressed for producing the final compressed article.

Two main types of compressor machines are known: eccentric machines and rotary machines. Eccentric machines have a single mold, provided with one or more compression chambers and inserted in a part referred to as base plate. In such machines, the mold is fixed in place and the feeding carriage moves with a movement which allows filling the mold with particulate material, filling the mold completely, eliminating the remaining particulate material, and ejecting the final compressed article.

Rotary compressor machines in turn have several molds and punches inserted in a circular movable base plate. In this case, the feeding carriage is fixed in place.

When using compressor machines fed by means of a carriage or hopper, a phenomenon referred to as segregation occurs, causing non-homogenous filling of the mold of the compressor machine with particulate material. Obviously, this phenomenon is worsened when the particulate material is formed by a mixture of particles of different materials with different properties. This segregation phenomenon is particularly detrimental in applications in which it is important to maintain a specific proportion of the different materials used for manufacturing the final compressed article, such as in the pharmaceutical industry for tablet preparation.

Furthermore, other detrimental circumstances can also occur such as compaction problems derived from the fact that some particles remain stuck to the walls and others do not, the possibility of the pills breaking when printing numbers, logos, etc., thereon.

This segregation phenomenon, which consists of the clustering of similar particles, occurs by means of a combination of several mechanisms:
- a condensation mechanism that occurs due to the difference in density between different particles making up the particulate material: heavier particles tend to be located in the lower portion and lighter particles in the upper portion;
- a convection mechanism: this mechanism occurs in mixtures of particles having different sizes which, when subjected to certain vibration conditions, experience cyclic movement which causes them to accumulate in localized regions;
- segregation by percolation caused by small particles entering empty spaces generated by larger particles, in the direction of gravitational acceleration, until the granular structure tends to locally consist of the same particles; and
- a segregation trajectory through which the effects of friction reduce the speeds of smaller or more angular particles in a thin layer of moving material.

The combination of one or more of the preceding mechanisms therefore causes the segregation or separation of different particles making up a starting particulate material as it moves from the feeding carriage to the mold of the compressor machine.

A first segregation phenomenon can occur when filling the feeding carriage given that the particles fall at different speeds depending on their properties and also bounce off one another and the walls of the carriage in a different manner.

Therefore, the properties of the particles (density, shape, size, etc.), the coefficients of friction (static and rolling) and the coefficient of restitution (in particle-particle and particle-carriage contacts), the carriage geometry, etc., affect this first segregation phenomenon.

The continuous filling of the mold/molds also causes a segregation phenomenon, given that the particles move within the carriage at different speeds due to the aforementioned factors.

In the case of eccentric compressor machines in which the feeding carriage is subjected to a continuous movement as mentioned above, this movement of the carriage causes an additional segregation of the particles present therein due to the previously mentioned factors.

As mentioned above, the feeding carriage geometry influences said segregation phenomena. However, it is not possible to design a feeding carriage with a universal optimum geometry which reduces segregation phenomena since said segregation also depends on other factors such as the properties and proportions of the different particles making up the particulate material, etc.

Patent document U.S. Pat. No. 6,764,296 discloses a fluidizing method for fluidizing the content of a feeding carriage in order to reduce these segregation phenomena. The particulate materials are passed through a fluidizer which is partitioned by means of a distributor plate to form first and second chambers. The particulate materials pass through said first chamber which is in gaseous communication with said second chamber by means of the porous distributor plate. Gas is delivered to the second chamber at a pressure sufficient to generate a gas bearing between the porous distributor plate and the particulate material. The gas is allowed to migrate through the particulate material, and then be vented to the surrounding atmosphere without causing substantial turbulence in the particulate material.

However, homogenization of the particulate material is hard to control by means of the method disclosed in patent document U.S. Pat. No. 6,764,296, and therefore it is not possible to assure that the final compressed articles will have the necessary weight and composition uniformity.

Therefore, there is still a need in the art for a feeding carriage which allows reducing segregation phenomena occurring when manufacturing compressed articles, thereby obtaining an improvement in weight and composition uniformity of said compressed articles.

DISCLOSURE OF THE INVENTION

The present invention solves the problems of the prior art by disclosing a feeding carriage for a compressor machine the geometry of which can be changed depending on the properties and proportions of the particles making up the starting particulate material, such that segregation phenomena occurring within said feeding carriage are minimized.

Specifically, according to a first aspect the present invention discloses a feeding carriage for a compressor machine of the type having an upper filling end through which a particulate material which is to be compressed in a mold of the compressor machine is introduced and a lower discharging end for discharging said particulate material towards said mold. At least some of the elements forming the feeding carriage of the present invention can move with respect to one another, which thereby allows modifying the geometry of at least one of said lower discharging end, said upper filling end and an intermediate portion of the feeding carriage located between both ends. The term "move" must be interpreted in a broad sense, said term being able to refer to "modifying" the position of the elements of the carriage in order to modify the geometry thereof, "changing the diameter" of the carriage in order to modify the geometry thereof or "changing" the section of the carriage, among other equivalent concepts.

According to a second aspect, the present invention discloses use of a feeding carriage for a compressor machine according to the first aspect of the present invention. The use according to the second aspect of the present invention comprises the steps of:

determining optimum carriage geometry for a particulate material to be compressed;

applying said optimum carriage geometry to the feeding carriage;

filling the feeding carriage with the particulate material; and operating the compressor machine to manufacture the compressed articles.

As will be described below in the present document, optimum carriage geometry can be determined by means of empirical tests or by means of computer simulation.

BRIEF DESCRIPTION OF THE DRAWINGS

The present invention will be better understood in reference to the following drawings illustrating preferred embodiments of the invention which are provided by way of example and must not be interpreted as limiting of the invention.

DETAILED DISCLOSURE OF THE PREFERRED EMBODIMENTS

As it is used throughout the present document and in the attached claims, the term "compressor machines" refers to machines used in any technical field for the preparation of compressed articles (pharmaceutical tablets, vitamins, parts for microelectronics, compacted structural parts, etc.) which can be fed with particulate material from a feeding carriage.

As it is used throughout the present document and in the attached claims, the term "particulate material" refers to any type of material used for the preparation of articles compressed by means of compressor machines, regardless of the size and shape (cylindrical, spherical, etc.) thereof.

Figure 1A:
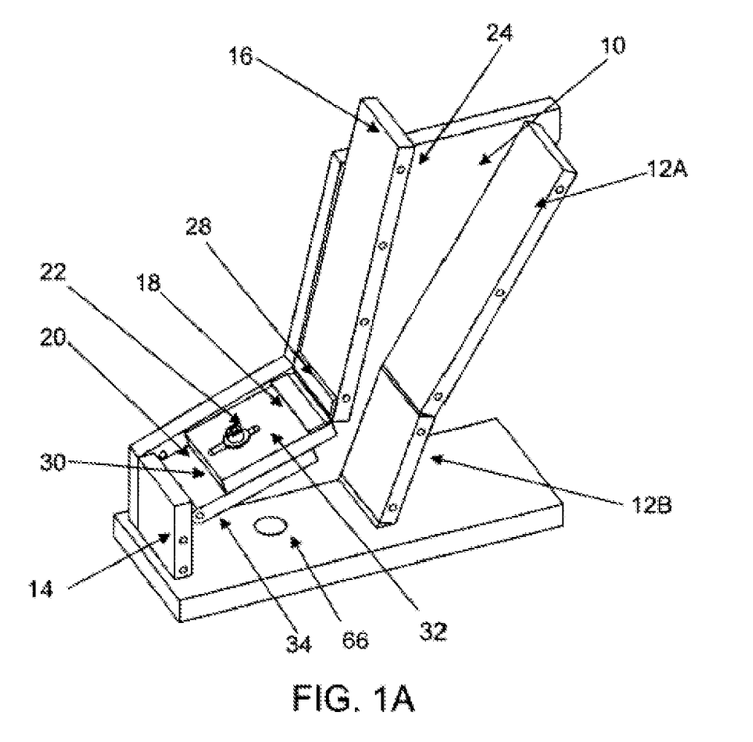
FIGS. 1A and 1B show perspective views of a feeding carriage according to a first preferred embodiment of the present invention.
Figure 1B:
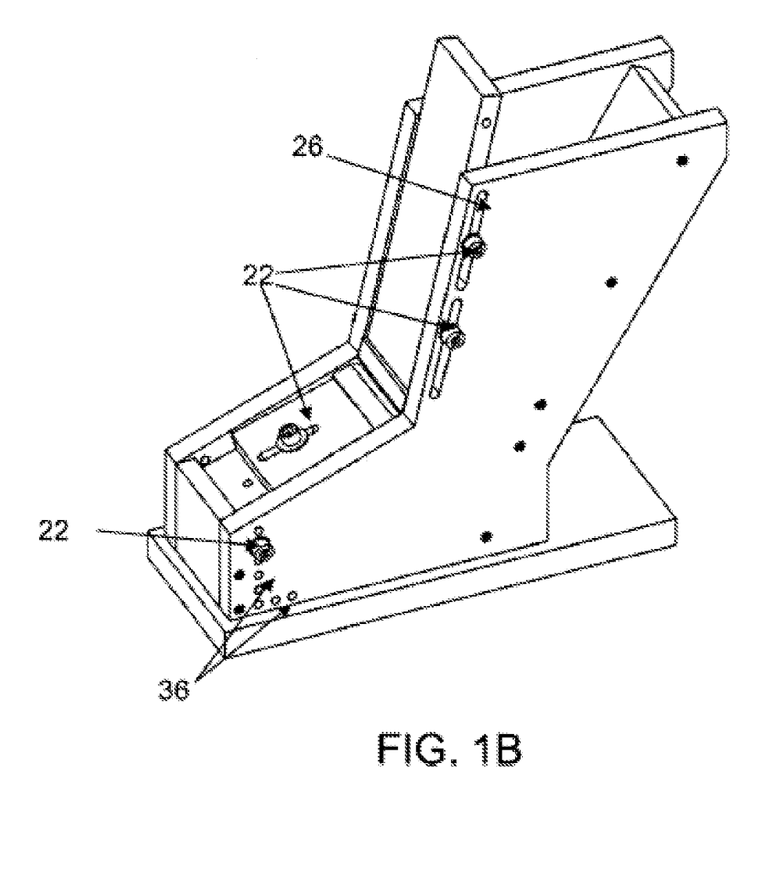

FIGS. 1A and 1B show a feeding carriage according to a first preferred embodiment of the present invention. This feeding carriage is formed by two side plates (10), two rear plates (12A, 12B) and a fixed lower front plate (14). These elements will remain fixed firmly in place for all the configurable feeding carriage geometries. The rear plates (12A, 12B) and the fixed lower front plate (14) are attached to the side plates (10) in a conventional manner by means of nuts and bolts. However, the person skilled in the art will understand that other attachment means such as welding, adhesives, etc., can be used.

In order to change its geometry, the feeding carriage further comprises a movable upper front plate (16), a first sliding front plate (18) and a second sliding front plate (20).

The upper front plate (16) can be fixed to both side plates (10) by means of nuts and bolts (22) in a plurality of positions. To that end, as can be seen in FIG. 1A, the upper front plate (16) has a plurality of threaded holes (24). In turn, as seen in FIG. 1B, the side plates (10) have a pair of grooves (26). The nuts and bolts are introduced through the grooves (26) into the threaded holes (24) for fixing the upper front plate (16) to the side plates (10) in the desired position.

The first sliding front plate (18) is in turn attached to the upper front plate (16) by means of a hinge (28) which allows changing the angle of inclination formed between both, thereby providing one more degree of freedom for changing the feeding carriage geometry.

The first sliding front plate (18) is attached to the second sliding front plate (20) by means of nuts and bolts (22) through a threaded hole (30) present in the second sliding front plate (20) and a groove (32) present in the first sliding front plate (18), said groove (32) allowing relative sliding of one sliding front plate with respect to the other. According to the preferred embodiment, the second sliding front plate (20) has a plurality of threaded holes (30), such that the first sliding front plate (18) and the second sliding front plate (20) can be fixed to one another in a plurality of positions by means of nuts and bolts (22) through the groove (32) and any one of the plurality of threaded holes (30).

Finally, the second sliding front plate (20) can be fixed to both side plates (10) by means of nuts and bolts (22) in a plurality of positions. To that end, the second sliding front plate (20) has a threaded hole (34) arranged to coincide with one of the plurality of holes (36) present in the side plates (10). Therefore, as will be described below in the present document, depending on which of the plurality of holes (36) of the side plates (10) in which the threaded hole (34) of the second sliding front plate (20) is fixed, the feeding carriage will have a different geometry that will influence segregation phenomena experienced by the particulate material therein.

According to the embodiment shown in FIGS. 1A and 1B, the second sliding front plate (20) can be fixed to the side plates (10) in eight different geometric configurations, whereby providing a wide choice for the feeding carriage geometry in order to reduce segregation phenomena occurring to the minimum. Obviously, the person skilled in the art will understand that this embodiment is not limiting and that other feeding carriages according to the present invention with a greater or smaller number of possible geometric configurations can be designed.

Figure 2A:
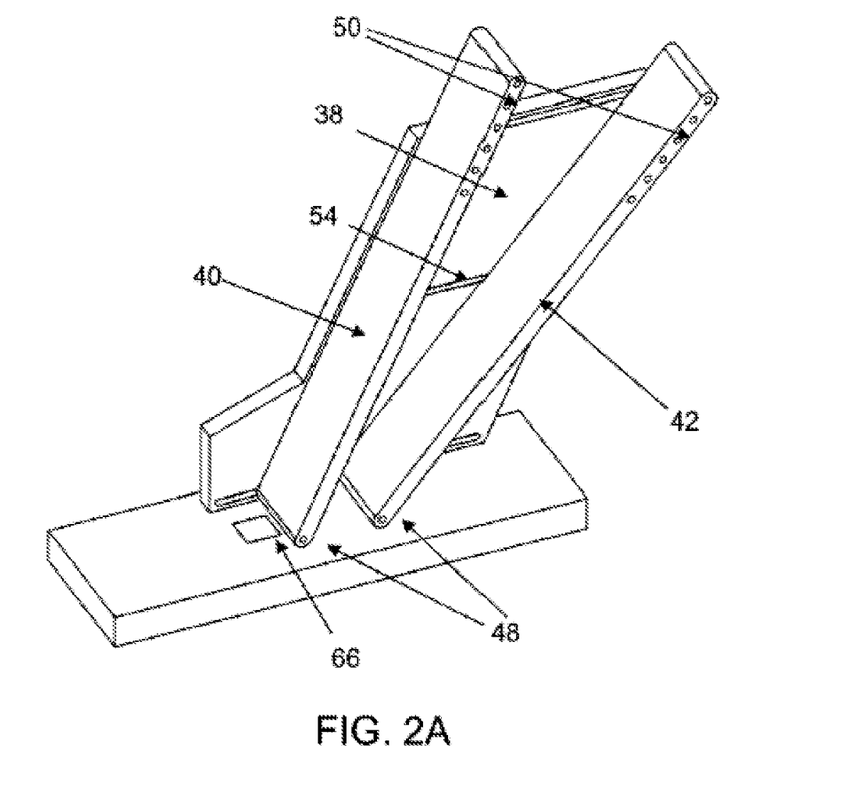
FIGS. 2A and 2B show perspective views of a feeding carriage according to a second preferred embodiment of the present invention.
Figure 2B:
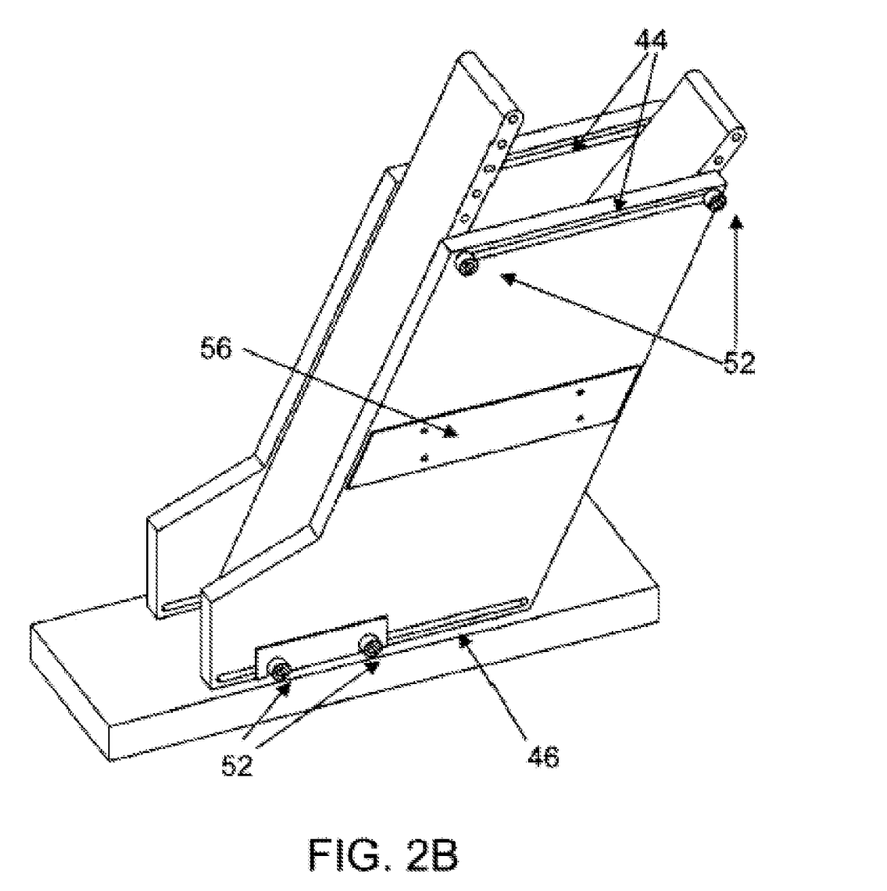

The attached FIGS. 2A and 2B show a second preferred embodiment of the feeding carriage of the present invention. According to this second embodiment, the feeding carriage is formed by two side plates (38), a front plate (40) and a rear plate (42). Each side plate (38) has an upper groove (44) and a lower groove (46). The front plate (40) and the rear plate (42) each have a lower threaded fixing hole (48) and a plurality of upper threaded fixing holes (50) for fixing said front plate (40) and rear plate (42) to the side plates (38) in a plurality of positions by means of nuts and bolts (52) through the lower grooves (46) and upper grooves (44), respectively.

The feeding carriage according to this second preferred embodiment of the invention therefore allows changing the entire carriage geometry from its upper filling end to its lower discharging end.

As can be seen in FIG. 2A, the side walls (38) also comprise an intermediate groove (54) the function of which is to adapt the feeding carriage for use according to a third preferred embodiment of the present invention described below in the present document. Given that said intermediate groove (54) is not of use according to this second preferred embodiment of the present invention, it is covered with a cover (56) to prevent the particulate material from leaking out through said intermediate groove (54).

Figure 3A:
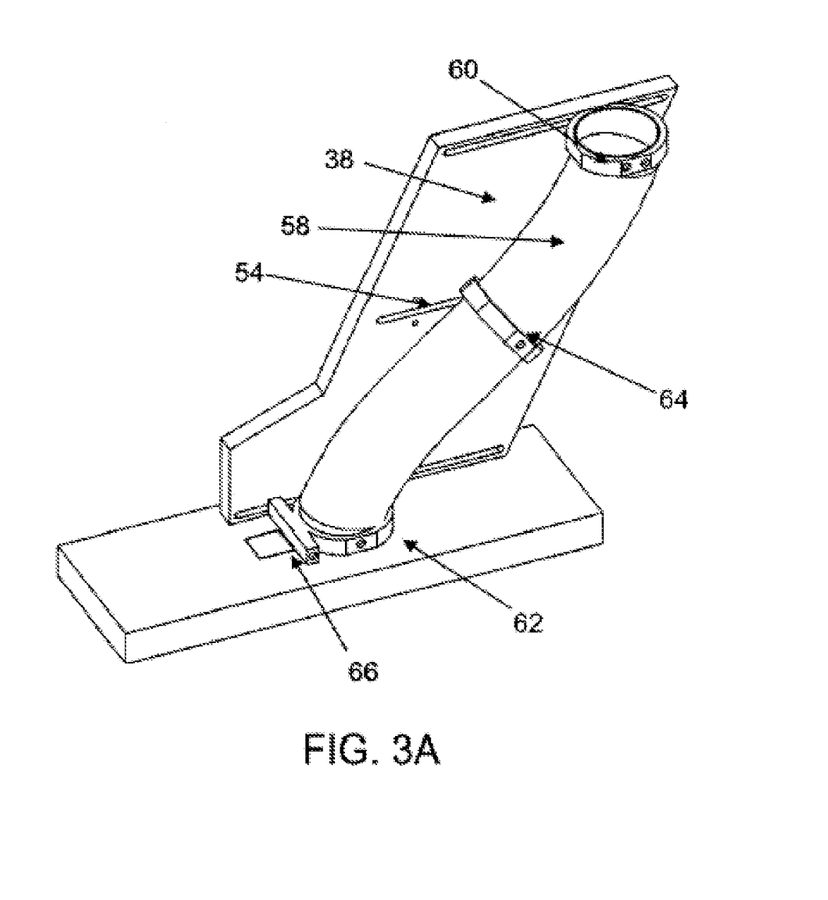
FIGS. 3A and 3B show perspective views of a feeding carriage according to a third preferred embodiment of the present invention.
Figure 3B:
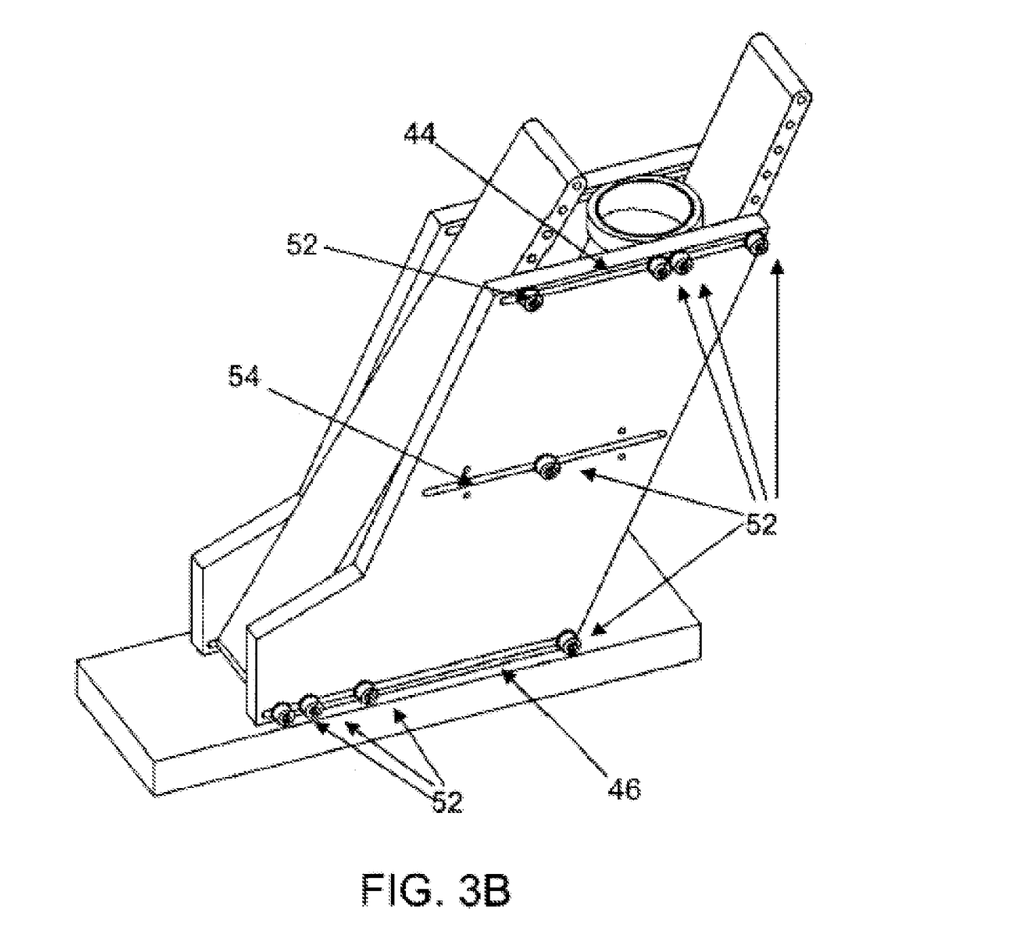

FIGS. 3A and 3B show a third preferred embodiment of the feeding carriage of the present invention. In this case, the composition of the feeding carriage is substantially similar to that of the feeding carriage according to the second preferred embodiment of the present invention described above, with the difference that it further comprises an inner tube (58) which runs along the feeding carriage from its upper filling end to its lower discharging end. The inner tube (58) is intended for containing therein the particulate material. The inner tube (58) has a first clamp (60) at its upper end, a second clamp (62) at its lower end and an intermediate clamp (64). Each clamp (60, 62, 64) comprises at least one threaded hole for fixing same by means of nuts and bolts to the side plates (38) through the upper grooves (44), lower grooves (46) and intermediate grooves (54), respectively, in a plurality of positions.

According to another embodiment of the present invention, the feeding carriage is formed by a tube (58), preferably made of a flexible material which allows bending but is rigid enough to maintain the fixed position. Said tube (58) has fixing means which allow changing the entire feeding carriage geometry. Said fixing means can be a first clamp (60) at its upper end and a second clamp (62) at its lower end, although other equivalent fixing means are allowed, whereby fixing points which allow changing the entire feeding carriage geometry from its upper filling end to its lower discharging end are provided. To fix the tube and to enable determining its geometry by means of the parameters indicated in the present specification, said tube can be fixed to a side plate (38) having an upper groove (44) and a lower groove (46), where the tube can be fixed by means of clamps (60, 62). The feeding carriage can comprise an intermediate clamp (64) for providing another fixing point.

The person skilled in the art will understand that the tube (58) can have a circular section, a square section or another suitable section type. At the same time, said section can remain constant or change along the path of the tube, as needed.

The feeding carriage according to the present invention (shown by way of example according to the preferred embodiments thereof) therefore allows changing the inner geometry thereof (either at its lower end or along the entire inner path of the feeding carriage) for the purpose of finding an optimum geometry which minimizes the segregation effects for each specific particulate material that is being used. Tablets that are uniform in weight and composition are thereby obtained when compressing the particulate material in a mold (66) of the compressor machine.

The present invention also discloses the use of a feeding carriage for a compressor machine such as any of those described above in the present document. Use according to the present invention comprises the steps of:
  determining optimum carriage geometry for a particulate material to be compressed;
  applying said optimum carriage geometry to the feeding carriage;
  filling the feeding carriage with the particulate material; and
  operating the compressor machine to manufacture the compressed articles.

The step of determining optimum carriage geometry can be performed empirically carrying out a series of tests until attaining said optimum geometry, or by means of computer simulation. Specifically, according to a preferred embodiment of the present invention the step of determining optimum carriage geometry comprises:
  a) applying a first geometry to the feeding carriage;
  b) manufacturing compressed articles with said first geometry;
  c) analyzing the composition of the compressed articles;
  d) repeating steps a)-c) for a plurality of different carriage geometries; and
  e) determining the optimum geometry for the particulate material used from among the plurality of geometries applied to the feeding carriage.

According to a second preferred embodiment of the present invention, the step of determining optimum carriage geometry comprises:
  a) entering parameters affecting particulate material segregation in the feeding carriage in computer software;
  b) performing particulate material segregation simulations with different feeding carriage geometries by means of said computer software; and
  c) determining the optimum geometry for the particulate material used from among the plurality of geometries simulated for the feeding carriage.

The computer software preferably performs said simulation based on the discrete element method (DEM). DEM is used in the art for studying segregation phenomena. It is an effective method for addressing discontinuous and granular material engineering and is particularly useful for studying granular particle flows, powder mechanics and rock mechanics.

The parameters which affect particulate material segregation in the feeding carriage and must be entered in the computer software to allow performing said simulation include, for example, the dimensions and density of the particulate material, as well as preferably also the coefficient of restitution, the coefficient of static friction and the coefficient of rolling friction between the particles of the particulate material and between the particulate material and feeding carriage.

Two illustrative and non-limiting examples of determining optimum carriage geometry for a feeding carriage according to the present invention are described below.

Example 1

In this first example, mixtures with two components, C1 and C2, were studied. Component C1 consisted of cylinders 1.6 mm in diameter and 1.6 mm in height and with a density of 1104 kg/cm$^3$. Component C2 consisted of cylinders 2.1 mm in diameter and 3.4 mm in height and with a density of 1021 kg/cm$^3$. Three mixtures of these components C1/C2 at 75%/25%, 25%/75% and 50%/50% were studied.

Figure 4:
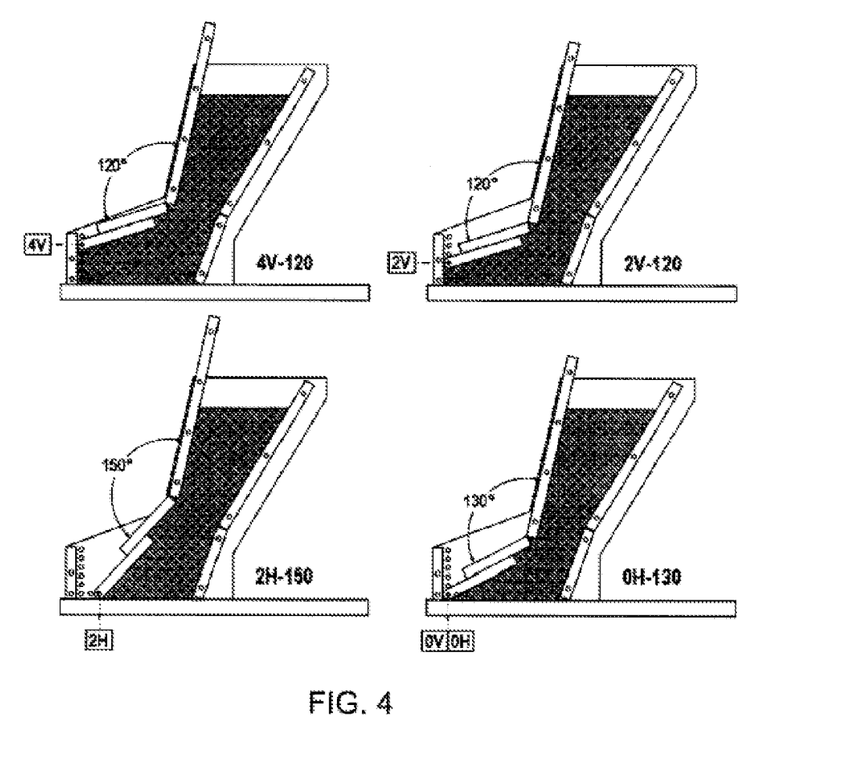
FIG. 4 shows side section views of a feeding carriage according to the first preferred embodiment of the invention in four different geometric configurations.

FIG. 4 shows the four carriage geometries studied for determining optimum geometry for each of those mixtures. Reciprocating movement of an actual feeding carriage was reproduced in terms of movements, times, speeds and accelerations in all the simulations. The studied geometries were:
4V-120: The second sliding front plate fixed to vertical hole 4 of the side plates. The first sliding front plate and the upper front plate form an angle of 120°.
2V-120: The second sliding front plate fixed to vertical hole 2 of the side plates. The first sliding front plate and the upper front plate form an angle of 120°.
2H-150: The second sliding front plate fixed to horizontal hole 2 of the side plates. The first sliding front plate and the upper front plate form an angle of 150°.
0H-130: The second sliding front plate fixed to hole 0 (corner hole) of the side plates. The first sliding front plate and the upper front plate form an angle of 130°.

The root-mean-square error (RMSE) corresponding, on one hand, to the first 50 tablets obtained and, on the other hand, to tablets 20-50 obtained in the so-called rated operating condition, was determined for each simulation. In fact, a first segregation phenomenon affecting approximately the first 20 tablets occurs when filling the non-operating feeding carriage. Tablets 20-50 are only affected by the actual segregation of the reciprocating movement of the feeding carriage.

Table 1 below shows the RMSE between the theoretical percentage of the reference component and the actual percentage of said reference component in the first 50 tablets. The RMSE therefore shows the degree of segregation occurring in the process, such that the lower the RMSE, the less the segregation that took place. Therefore, the values in bold indicate optimum carriage geometry.

TABLE 1

| Percentage of components | Configuration | | | | Reference component (theoretical |
|---|---|---|---|---|---|
| C1/C2 | 4V-120 | 2V-120 | 2H-150 | 0H-130 | percentage) |
| 75/25 | 6.40 | 3.97 | 4.02 | 3.49 | C2 (25%) |
| 25/75 | 6.02 | 3.68 | 4.26 | 3.78 | C1 (25%) |
| 50/50 | 7.87 | 4.88 | 4.50 | 4.85 | C1/C2 (50%) |

Table 2 below shows the RMSE between the theoretical percentage of the reference component and the actual percentage of said reference component of tablet 20 to tablet 50. The values in bold indicate optimum carriage geometry.

TABLE 2

| Percentage of components | Configuration | | | | Reference component (theoretical |
|---|---|---|---|---|---|
| C1/C2 | 4V-120 | 2V-120 | 2H-150 | 0H-130 | percentage) |
| 75/25 | 4.34 | 2.38 | 3.36 | 2.15 | C2 (25%) |
| 25/75 | 3.17 | 2.02 | 3.87 | 1.88 | C1 (25%) |
| 50/50 | 5.03 | 2.37 | 4.26 | 2.53 | C1/C2 (50%) |

As can be seen from the preceding tables, optimum carriage configuration changes with the proportion of the different particles making up the particulate material used as raw material. Therefore, there is a proven need for a carriage having a variable geometry such as the one disclosed in a novel manner by the present invention which is adaptable and can provide optimum configuration for each composition of different particulate material used as raw material.

Example 2

Simulations similar to those in Example 1 were performed by means of the discrete element method. In this case, the particles making up the particulate material were:

Component C1: Spheres 2 mm in diameter and with a density of 1150 kg/cm$^3$.

Component C2: Spheres 4 mm in diameter and with a density of 1150 kg/cm$^3$.

In this case, other additional parameters also affecting segregation phenomena occurring inside the feeding carriage were also taken into account in the computer simulation. These parameters are summarized in Table 3 below:

TABLE 3

| | | C1 | C2 |
|---|---|---|---|
| Coefficient of restitution | Particle-carriage | 0.2 | 0.2 |
| | Particle-particle | 0.7 | 0.7 |
| Coefficient of static friction | Particle-carriage | 0.5 | 0.5 |
| | Particle-particle | 0.5 | 0.5 |
| Coefficient of rolling friction | Particle-carriage | 0 | 0 |
| | Particle-particle | 0.5 | 0.5 |

Three different proportions of components C1/C2 at 15%/85%, 85%/15% and 50%/50% were studied in two different geometries of each of the three preferred embodiments of the feeding carriage of the present invention described above in the present document (FIGS. 1A, 1B; 2A, 2B; and 3A, 3B, respectively).

Figure 5A:
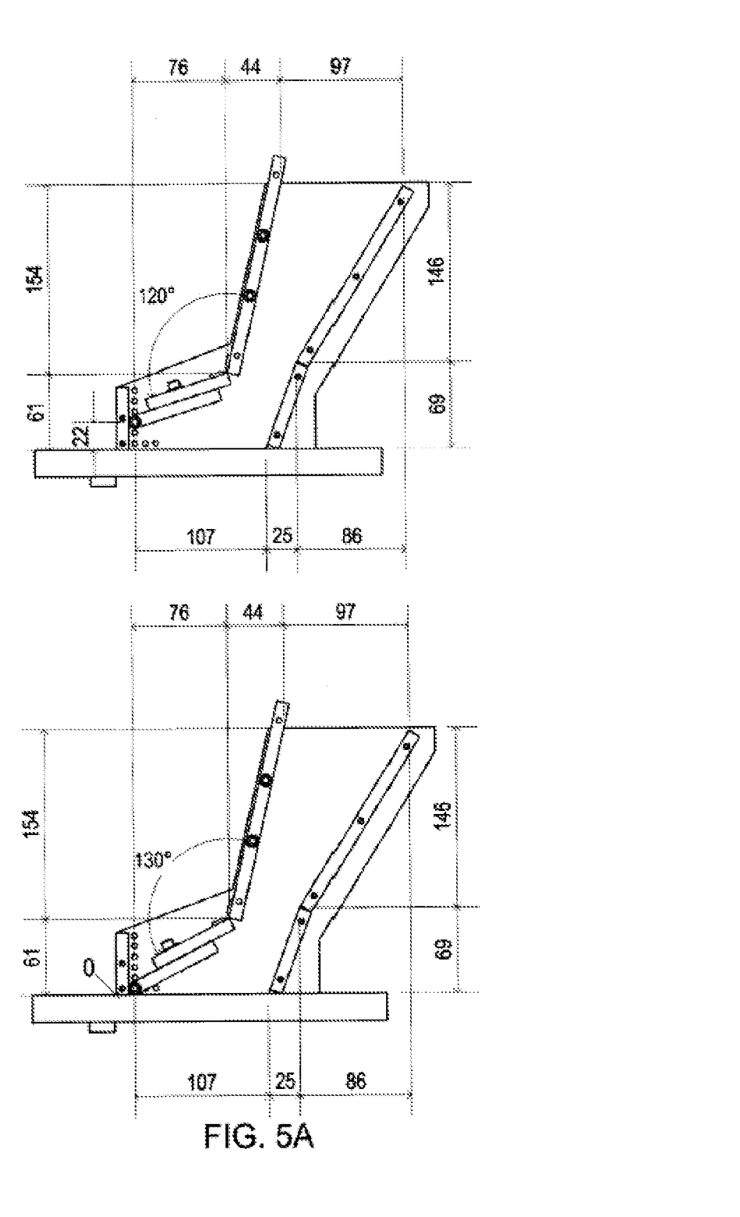
FIG. 5A shows side section views of a feeding carriage according to the first preferred embodiment of the invention in two different geometric configurations.
Figure 5B:
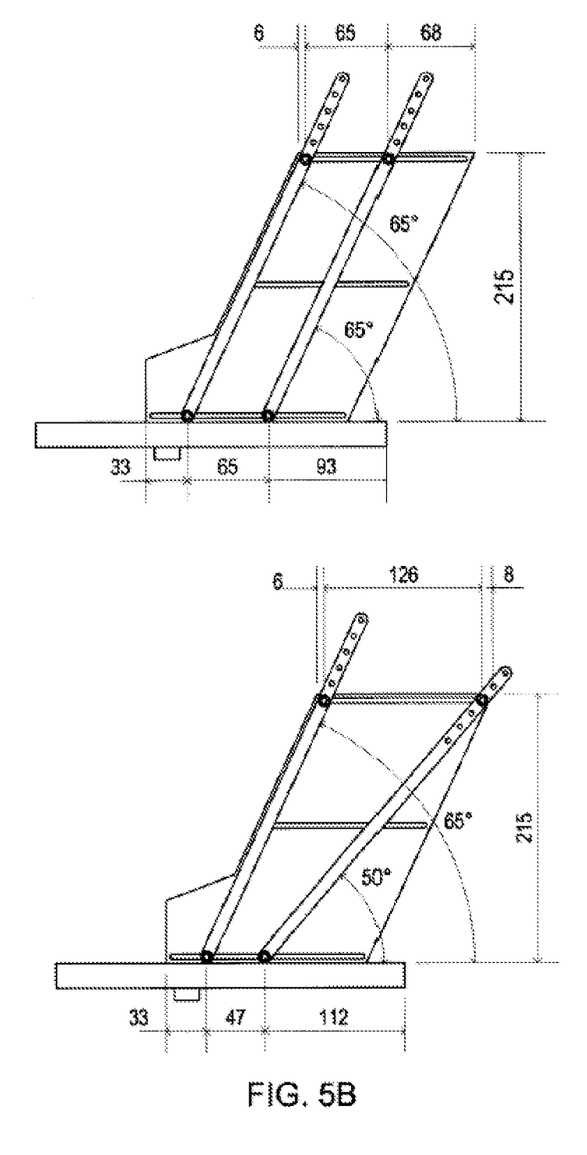
FIG. 5B shows side section views of a feeding carriage according to the second preferred embodiment of the invention in two different geometric configurations.
Figure 5C:
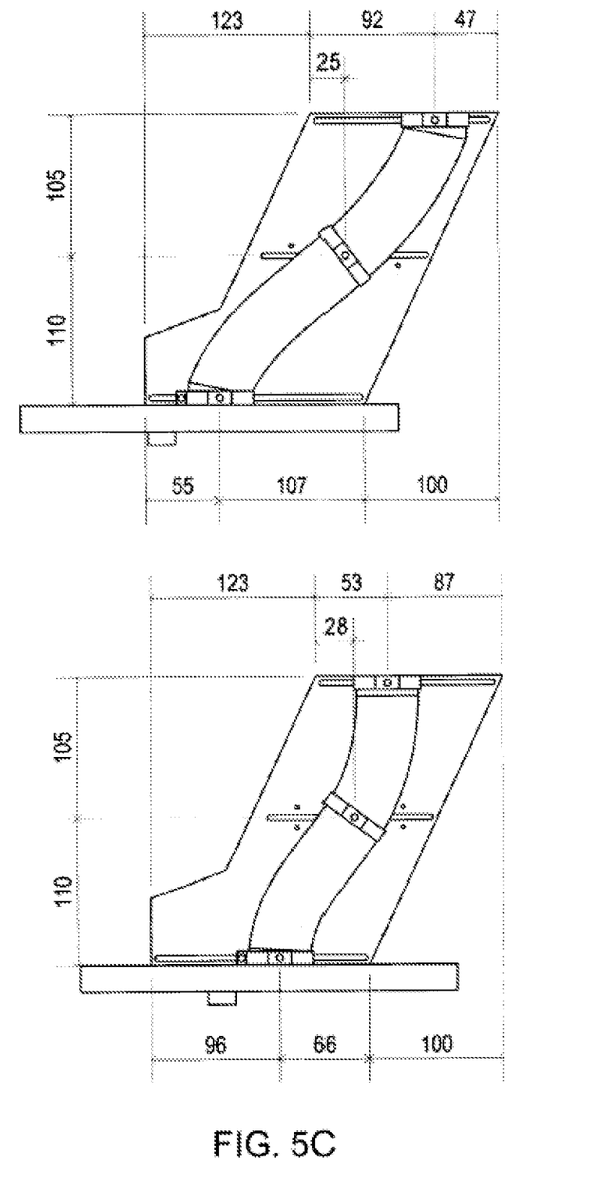
FIG. 5C shows side section views of a feeding carriage according to the third preferred embodiment of the invention in two different geometric configurations.

The attached FIGS. 5A, 5B and 5C each show the two studied feeding carriage configurations according to several preferred embodiments of the present invention. The dimensions included in said drawings constitute the exact geometric arrangements under study.

Tables 4, 5 and 6 below show the RMSE results obtained for each of the configurations studied for each of the feeding carriage configurations. Once again, values in bold indicate optimum carriage geometry for each case.

TABLE 4

| First embodiment of the feeding carriage | | | |
|---|---|---|---|
| Percentage of components | Configuration | | Reference component |
| C1/C2 | A | B | (theoretical percentage) |
| 15/85 | 5.822 | 6.293 | C1 (15%) |
| 85/15 | 6.401 | 5.433 | C2 (15%) |
| 50/50 | 8.818 | 7.024 | C1 (50%) |

TABLE 5

Second embodiment of the feeding carriage

| Percentage of components | Configuration | | Reference component |
|---|---|---|---|
| C1/C2 | A | B | (theoretical percentage) |
| 15/85 | 7.718 | 4.178 | C1 (15%) |
| 85/15 | 6.648 | 8.586 | C2 (15%) |
| 50/50 | 6.138 | 7.626 | C1 (50%) |

TABLE 6

Third embodiment of the feeding carriage

| Percentage of components | Configuration | | Reference component |
|---|---|---|---|
| C1/C2 | A | B | (theoretical percentage) |
| 15/85 | 2.471 | 3.911 | C1 (15%) |
| 85/15 | 5.293 | 5.277 | C2 (15%) |
| 50/50 | 4.339 | 6.022 | C1 (50%) |

Although the present invention has been described in reference to several preferred embodiments thereof, the person skilled in the art will understand that modifications and variations can be applied thereto without departing from the essence and scope of the present invention.

For example, although several embodiments of feeding carriages for compressor machines the geometry of which can be changed according to several configurations have been described, it must be understood that the invention is not limited to said embodiments and generally relates to a feeding carriage for a compressor machine of the type having an upper filling end through which a particulate material which is to be compressed in a mold of the compressor machine is introduced and a lower discharging end for discharging said particulate material towards said mold, provided that at least some of the elements forming said feeding carriage can move with respect to one another, which thereby allows modifying the geometry of at least one of said lower discharging end, said upper filling end and an intermediate portion of the feeding carriage located between both ends. In practice, being able to define all the geometric parameters of the carriage which can have different shape variations (regardless of its shape, it is possible to determine/calculate its geometry) and being able to define the different parameters of the actual mixture to be compressed and other mechanical parameters of the process enable determining said optimum carriage geometry by means of software or by empirical means, which significantly reduces the segregation effect of the compressed material. Once the optimum geometry is determined, the carriage is suitably configured according to the determined data.

Likewise, although a feeding carriage according to the first preferred embodiment of the invention having two rear plates has been described, it must be understood that additional embodiments of said feeding carriage can have a single rear plate, or more than two rear plates, without departing from the scope of the invention.

Similarly, although a feeding carriage according to the third preferred embodiment of the invention having an intermediate groove and an intermediate clamp has been described, it must be understood that other embodiments of the feeding carriage may lack said intermediate groove and intermediate clamp.

The different elements forming the feeding carriage of the present invention can be any suitable material commonly used in the art, such as steel, for example. In the case of comprising an inner tube, it can be manufactured from any suitable material, such as polyethylene, PVC, steel, etc.

The feeding carriage of the present invention can have number markings, angle markings, etc., to help the user configure the different possible geometries thereof.

The feeding carriage of the present invention can be applied to any suitable type of compressor machine, be it an eccentric machine or a rotary machine.

The invention claimed is:

1. A feeding carriage for a compressor machine of the type having an upper filling end through which a particulate material which is to be compressed in a mold of the compressor machine is introduced and a lower discharging end for discharging said particulate material towards said mold, comprising:
    two side plates;
    at least one rear plate;
    a fixed lower front plate;
    a movable upper front plate;
    a first sliding front plate; and
    a second sliding front plate;
wherein at least some elements forming said feeding carriage can move with respect to one another, which thereby allows modifying the geometry of at least one of said lower discharging end, said upper filling end and an intermediate portion of the feeding carriage located between both ends.

2. The feeding carriage according to claim 1, wherein:
    the upper front plate can be fixed to each side plate in a plurality of positions by means of nuts and bolts through a plurality of threaded holes in the upper front plate and a plurality of corresponding grooves in each side plate;
    the first sliding front plate is attached to the upper front plate by means of a hinge which allows changing the angle of inclination formed between both;
    the first sliding front plate is attached to the second sliding front plate by means of nuts and bolts through a threaded hole present in one of the first or second sliding front plates and a groove present in the other one of the second or first sliding front plates, said groove allowing relative sliding of one sliding front plate with respect to the other;
    the second sliding front plate can be fixed to each side plate in a plurality of positions by means of nuts and bolts through a threaded hole in the second sliding front plate and one of a plurality of holes in each side plate;
whereby the different possible fixing positions of the upper front plate, the first sliding front plate and the second sliding front plate allow changing the geometry of the lower discharging end of the feeding carriage.

3. The feeding carriage according to claim 1, wherein the first sliding front plate has a groove and the second sliding front plate has a plurality of threaded holes allowing the fixing of the first sliding front plate and the second sliding front plate by means of nuts and bolts through any one of said plurality of threaded holes and the groove in a plurality of positions.

4. The feeding carriage according to claim 1, wherein it is formed by a tube, said tube having a first clamp at its upper end and a second clamp at its lower end whereby fixing points which allow changing the feeding carriage geometry from its upper filling end to its lower discharging end are provided.

5. A feeding carriage for a compressor machine of the type having an upper filling end through which a particulate material which is to be compressed in a mold of the compressor machine is introduced and a lower discharging end for discharging said particulate material towards said mold, comprising:

two side plates each having an upper groove and a lower groove;

a movable front plate; and a movable rear plate, the front and rear plates each having a lower threaded fixing hole and a plurality of upper threaded fixing holes for fixing said front plate and rear plate to the side plates in a plurality of positions by means of nuts and bolts through the lower grooves and upper grooves, respectively; and an inner tube running along the feeding carriage from its upper filling end to its lower discharging end and intended for containing therein the particulate material, the inner tube having a first clamp at its upper end and a second clamp at its lower end, each clamp having at least one threaded hole for fixing thereof by means of nuts and bolts to the side plates through the upper grooves and lower grooves in a plurality of positions;

thereby allowing changing the feeding carriage geometry from its upper filling end to its lower discharging end.

6. The feeding carriage according to claim 5, wherein each of the side walls further comprises an intermediate groove between the upper groove and the lower groove, and the inner tube further comprises an intermediate clamp with at least one threaded fixing hole for fixing thereof by means of nuts and bolts to the side plates through the intermediate grooves.

7. The feeding carriage according to claim 4, wherein it comprises an intermediate clamp for providing another fixing point.

* * * * *